United States Patent Office 2,967,485
Patented Jan. 10, 1961

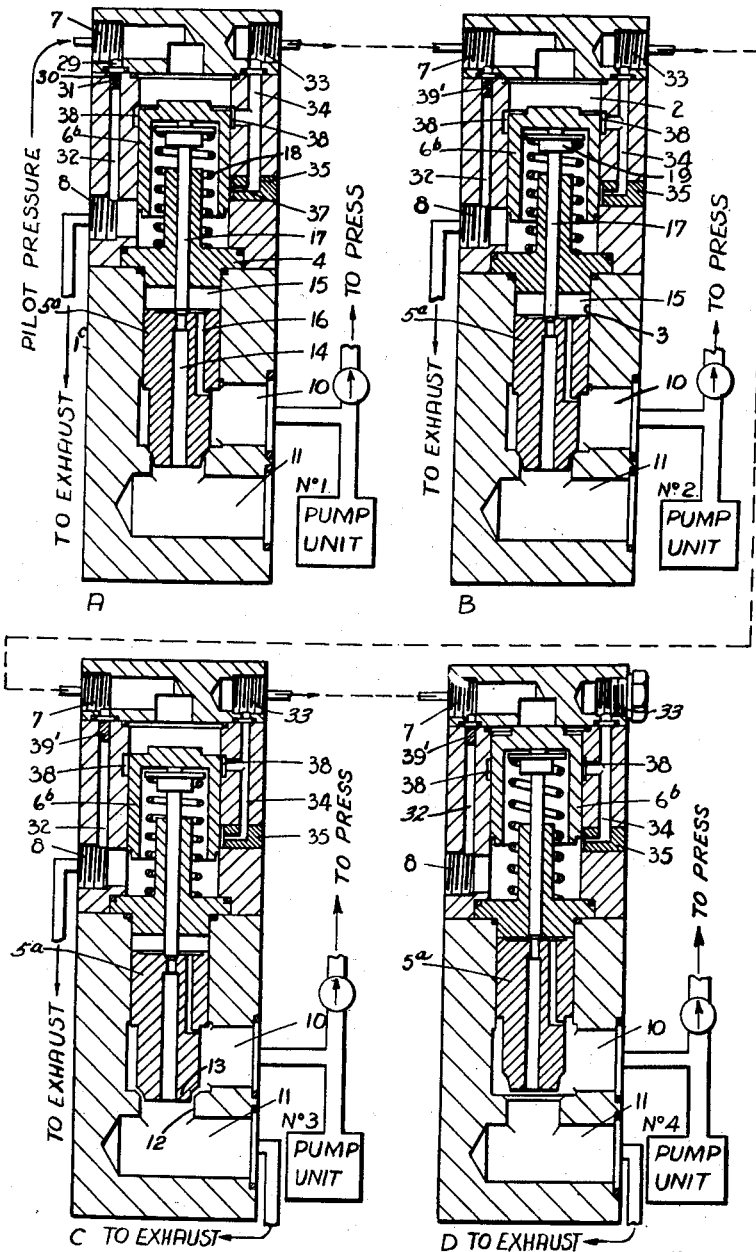

2,967,485

PRESSURE ACTUATED BY-PASS VALVES

Frank Hathorn Towler, Dob Park, Otley, England, and John Maurice Towler, deceased, late of Mayfair, London, England, by Frank Hathorn Towler, executor, Dob Park, Otley, England, assignors to Electraulic Presses Limited, Rodley, near Leeds, England, a limited-liability company of Great Britain Original application Dec. 4, 1952, Ser. No. 324,104, now Patent No. 2,805,038, dated Sept. 3, 1957. Divided and this application Jan. 3, 1957, Ser. No. 632,341

Claims priority, application Great Britain Dec. 7, 1951

5 Claims. (Cl. 103—11)

This invention relates to by-pass valves of the type in which fluid flow between inlet and outlet ports is controlled by an axially movable valve member or spindle, and it is more particularly concerned with by-pass valves in which the positioning of the movable valve member is controlled by pressure fluid supplied from a source other than that of the fluid by-passed by the valve. This invention is a division of our copending application, Serial No. 324,104, filed December 4, 1952, which issued as Patent No. 2,805,038.

One object of the invention is to provide a by-pass valve of the above general character which is particularly well adapted to provide for loading and unloading a plurality of pumps in predetermined sequence to eliminate or reduce shock in the exhaust system. A more specific object is to provide a by-pass valve construction which permits a plurality of such valves to be operatively connected in series relation to provide for sequential operation either to loading or unloading positions.

Other objects and advantages of the invention will become apparent from the following detailed description of the preferred embodiments illustrated in the accompanying drawing.

In order that the invention may be clearly understood and carried into effect several examples of by-pass valve according to the present invention and the manner in which a series of the same may be used for loading and unloading an equivalent number of pumps in series will now be described by aid of the accompanying drawing in which:

The figure is a diagram illustrating one manner of using four by-pass valves for loading and unloading in sequence four pumps.

Like parts throughout the views in the accompanying drawing will be denoted by like reference numerals.

The valve illustrated in the drawing comprises a valve body 1c, having a bore within the interior of the valve body which is divided laterally into two portions or chambers 2 and 3 by a guide member 4, the portion 2 forming a hydraulic cylinder for pilot pressure liquid and the other portion 3 a bore proper for the slidable reception of a primary valve member 5a. Within the hydraulic cylinder 2 is disposed a piston 6b for reciprocating movement therein, the pilot pressure liquid entering the cylinder 2 on one side of this piston 6b through an inlet 7. Fluid is exhausted from the opposite side of the piston through an outlet 8.

An inlet 10 and an outlet 11 in the valve body 1 for primary pressure liquid are connected by a passage 12 which is opened and closed by a head or mitre valve 13 forming part of the valve member 5a. Extending through the valve member 5a is a longitudinal passage 14 which allows primary pressure liquid to flow to the outlet 11 from a balancing chamber or space 15 on the opposite side of the valve member 5a.

Primary pressure liquid from the inlet 10 obtains an entry into the balancing chamber 15 by way of a permanently open passage 16 of restricted area extending axially of the valve member 5a and its return flow through the longitudinal passage 14 at a greater rate than through the passage 16 is controlled by a needle valve 17 slidable in an axial bore in the guide member 4 and having a tapered end which seats within the opposing end of the passage 14.

The object of the permanently open and restricted passage 16 is to maintain a pressure balance on both sides of the primary valve member 5a until this balance is upset upon the opening of the longitudinal passage 14. The pressure stroke of the piston 6b is opposed by a spring 18 and such spring in this instance serves to move the piston to cause the needle valve to open the passage 14. Upon the upset of the aforesaid pressure balance the primary valve member 5a is forced by the pressure at the inlet 10 to follow the movement of the needle valve and in so doing to open the passage 12.

In the exemplary valve the pilot pressure liquid is admitted to the cylinder 2 above the piston 6b and the spring 18 is disposed within the piston and seats against a pad 19 on the outer end of the needle valve 17 whereby the same tends to lift the valve 17 from its seat against the opposing pressure on the piston 6b.

A restricted by-pass between the pilot pressure inlet 7 and the exhaust passage is formed by a hole 29 drilled in the end cover of the valve body, a plug 30 threaded into the hole and formed with an orifice 31, and a passage 32 drilled in the valve body. This is to enable pilot pressure liquid from the space on the outside of the piston 6b to escape at a pretermined rate into the outlet 8 to exhaust. The permitted rate of escape through the orifice 31 is such as will ensure the maintaining of a pressure on the outside of the piston which will overcome the opposing pressure of the spring 18.

Thus with pilot pressure liquid admitted to the upper end of the cylinder 2 the passage 12 will be closed and upon interrupting the admission of pilot pressure liquid to the cylinder 2 or if such supply fails the spring 18 will carry the needle valve 17 and the piston 6 upwards or outwards at a rate which will be determined by the force of the spring 18 in relation to the combined area of the orifice 31.

In consequence of this upward or outward movement of the needle valve the same will be lifted from its seat and allow the pressure within the space 15 to escape through the longitudinal passage 14. As the rate of this escape will be greater than the rate at which liquid can enter the space 15 up the restricted passage 16 the pressure balance on opposite ends of the valve member 5a will be upset and this valve member will accordingly follow the needle valve until they again meet and effect reclosing of the longitudinal passage 14 when the pressure balance will once more be restored. In this new position of the valve member 5a the passage 12 connecting the inlet 10 to the outlet 11 will be opened.

The spring 18 is designed to have considerable force in relation to the small force in the same direction which may be applied by pressure acting on the end of the needle valve or pilot spindle which projects into the space 15 so as to ensure that the rate of movement of the pilot spindle shall not be very materially affected by variations of pressure within the body of the by-pass valve and it will be understood that the rate of movement of the valve member 5a will be coincident therewith.

In the embodiment described above, it will be seen that the movement of the by-pass valve member 5a in one direction or both directions may be effected by the pressure of the primary fluid, which flows through and is controlled by the by-pass valve member, acting upon an area of the by-pass valve member, but in all cases the said movement is initiated by the pilot-piston 6b actuated by pilot-pressure and it is controlled by a separate pilot control valve not shown designed to admit or interrupt the admission of pilot-pressure to the pilot-piston. Thus, if pilot-pressure liquid is admitted to the pilot-piston at a sufficient rate, the velocity across the escape orifice 31 will be such as to increase the pressure in the pilot-cylinder so that it overcomes the force of the pilot-spring 18 and forces the pilot-piston downwards, thereby causing the by-pass valve to close; and the rate of closing will be determined by the rate at which pilot-pressure is supplied. On the other hand, if the supply of pilot-pressure is interrupted, the pilot-spring will immediately force the pilot piston upwards, thereby causing the by-pass valve to open; and the rate of opening will be determined by the area of the pilot-piston in relation to the area of the escape orifice 31 and the force of the pilot-spring. Furthermore, it will be appreciated that the operation of the by-pass valve can be controlled by a very simple pilot-control valve having only two operative positions, open-closed, designed to admit and interrupt the flow of pilot-pressure liquid to the pilot-piston. The flow is unidirectional from pilot-control valve to pilot-piston, and the pipe friction can be taken care of by providing adequate pilot-pressure. Reverse flow is through the orifice 31 within the pilot-piston assembly and therefore not affected by pipe friction and not very materially affected by changes of viscosity of the pilot-pressure liquid. That is to say that the said orifice 31 is located within the pilot-piston or within the pilot-piston assembly, to permit a restricted flow of pilot pressure liquid from one side of the piston to the exhaust, so that displacement of liquid takes place from the pilot-piston cylinder when the piston is moved by the pilot-spring and there is not material displacement along the exhaust pipes except when the pilot piston is being moved downwards, and held at the lower end of its stroke by pilot pressure.

When two or more such by-pass valves are employed in a system for loading or unloading a similar number of pump units, the valves will be connected in the manner shown in the figure. More particularly, pilot pressure oil is supplied directly to connection 7 of valve A only. The connection 7 of the valve B, on the other hand is connected to port 33 of valve A which is connected by a drilled passage 34, and a radial passage with an annular groove 38 in the piston chamber 2 adjacent its upper end. Passage 34 is also in communication with the lower end of the chamber 2 by way of a restricted orifice 37. The orifice in this case is formed in a plug 35 threaded into the valve body. Valve C is similarly connected to valve B and valve D to valve C. It will also be noticed that plug 30 incorporating orifice 31 is replaced on valves B, C, D, etc., with a solid plug 39'.

Thus when the pumps are required to be loaded at the commencement of a press cycle, pilot pressure oil will be supplied to 7 of valve A. This will push the piston 6b downwards, which in turn will close the mitre seat on valve member 5a and load the pump unit controlled by valve A. When the piston 6b has covered the major portion of its stroke, say within 1/16" of closing, the upper face of the piston 6b will enter in the annular groove 38. Thus pilot pressure oil can now proceed via annular groove 38, drilled passage 34, connection 33 of by-pass valve A to connection 7 of by-pass valve B. Valve B will now close in exactly the same manner as valve A, and the pump unit controlled by valve B will be brought on to load. Similarly pilot pressure oil is fed in turn to by-pass valve C, and D etc., and all the pumps in the system will be brought in, in sequence, thus eliminating shock waves in the system.

As previously stated, it is equally desirous to unload the pump units in sequence, when the press cycle or part of the cycle has been completed, to avoid shocks in low pressure exhaust lines. As described when pilot pressure oil to the by-pass valve is interrupted, spring 18 will lift the piston 6b and pilot spindle 17, liquid being displaced from the chamber above the piston, through the orifice 31.

The rate of lift, and consequently, the rate of opening of the mitre seated valve member 5a, depends upon the load of spring 18, and area of orifice 31.

It will be appreciated that when the mitre seated valve member 5a begins to lift, high presure pump delivery, connected in at 10, can pass to exhaust via 11.

To achieve this "sequence unloading," the first valve A has an orifice 31 in the plug 30; in the following valves, however, the plug 39' is solid.

Thus, when the needle valve 17 and piston 6b of the first valve A has lifted approximately 1/8", the lower edge or skirt of the piston 6b will commence to uncover the drilled passage containing the plug 35. This passage is connected by the orifice 37, drilled passage 34 and connection 33 of valve A to connection 7 of valve B and thence to the chamber above the piston 6 of valve B.

Spring 18 of valve B will now be able to lift the piston 6b and pilot spindle 17 of valve B, displacing liquid from above the piston via the orifice 37 and connection 8 of valve A to exhaust.

Thus, the mitre seated valve member 5a of valve B will begin to lift, and the pump units controlled by valve B will commence to unload. Similarly, when the piston 6b has lifted approximately 1/8", the piston and spindle of valve C will commence to lift, and the pump units will be unloaded in sequence.

We claim as our invention:

1. In a hydraulic system including a plurality of continuously running pressure fluid pumps, a by-pass valve for each pump normally operative to unload the pump by diverting its delivery to exhaust, a pressure fluid operated controller for each valve, an inlet and an outlet for pressure fluid in each controller, said controllers being connected in series with the pilot pressure outlet of the first valve controller connected to the pilot pressure inlet of the next valve controller in the series and so on throughout the series, conduit means connected to the inlet of the first valve controller for supplying thereto pilot pressure fluid to cause the controller to close the associated valve and interrupt the diversion of the pump delivery to exhaust whereby to load the pump, said first valve controller and succeeding controllers acting upon operation to direct pilot pressure fluid to the succeeding controller to load the associated pumps in succession, said controllers acting upon interruption of the supply of pilot pressure fluid to allow the associated valves to open and unload the pumps in the same order in which they were loaded.

2. A hydraulic system as defined in claim 1 in which the first actuator of the series is provided with an orifice connected to continuously bleed pilot pressure fluid therefrom so that a predetermined flow of fluid is required to maintain the valve closed, and wherein that orifice similarly coacts with the other actuators of the series when connected to receive pilot pressure fluid.

3. A hydraulic system as defined in claim 1 in which the first actuator of the series is provided with an orifice connected to exhaust fluid from that actuator and permit its return to rest position upon interruption of the supply of pilot pressure fluid, and wherein each actuator is arranged upon return to rest position to connect the succeeding actuator for exhaust through said orifice.

4. A hydraulic system as defined in claim 1 in which additional means is incorporated in each actuator for initiating exhaust of fluid from the succeeding actuator upon return of the preceding actuator to normal unoperated position.

5. In a hydraulic system including a plurality of continuously running pressure fluid pumps, in combination, a like plurality of valves each individual to and connected with one of the pumps, each of said valves being normally open and effective to divert the output of the associated pump to an exhaust line, said valves when closed being operative to interrupt the diversion of fluid and place the pumps on load, a pressure fluid operated controller for each valve including a cylinder with a working piston reciprocal therein, means operatively connecting the piston with the associated valve, spring means normally urging each piston in a direction to open the associated valve, conduits connecting the controller cylinders in series, a conduit connected to the cylinder of the first controller of the series for supplying pressure fluid thereto to shift the piston in a direction to close the first valve, the conduits connecting the controller cylinders being related thereto so as to establish communication to each succeeding cylinder after the piston in the preceding cylinder has advanced a predetermined distance.

References Cited in the file of this patent
UNITED STATES PATENTS

| | | |
|---|---|---|
| 1,002,306 | Perkins | Sept. 5, 1911 |
| 1,769,898 | Mathews | July 1, 1930 |
| 2,246,913 | Collins | June 24, 1941 |
| 2,420,052 | Muir | May 6, 1947 |
| 2,617,361 | Neal | Nov. 11, 1952 |
| 2,805,038 | Towler et al. | Sept. 3, 1957 |